US005608805A

United States Patent [19]
Mandell et al.

[11] Patent Number: 5,608,805
[45] Date of Patent: *Mar. 4, 1997

[54] DYNAMIC LOADER

[75] Inventors: Douglas E. Mandell, San Francisco; Martin J. Richards, Redwood City; Mark L. Atherton, San Bruno; Paul R. Goldberg, Palo Alto; Mark F. Davis, Pacifica, all of Calif.

[73] Assignee: Dolby Laboratories Licensing Corporation, San Francisco, Calif.

[ * ] Notice: The term of this patent shall not extend beyond the expiration date of Pat. No. 5,390,256.

[21] Appl. No.: 387,553

[22] Filed: Feb. 13, 1995

Related U.S. Application Data

[63] Continuation of Ser. No. 891,590, Jun. 1, 1992, Pat. No. 5,390,256, which is a continuation-in-part of Ser. No. 804,976, Dec. 11, 1991, abandoned, which is a continuation-in-part of Ser. No. 638,896, Jan. 8, 1991, abandoned.

[51] Int. Cl.$^6$ ....................................................... H04B 3/00
[52] U.S. Cl. ........................................ 381/77; 381/2; 352/6
[58] Field of Search .................................. 381/77, 2, 124; 352/1, 6; 455/2, 3.2, 4.2, 6.3, 70; 348/484; 358/343, 86; 375/8; 360/19.1, 27; 369/47, 48, 50

[56] References Cited

U.S. PATENT DOCUMENTS

| | | | |
|---|---|---|---|
| 4,517,410 | 5/1985 | Williams et al. | 379/76 |
| 4,594,591 | 6/1986 | Burke | 455/70 |
| 4,654,881 | 3/1987 | Dolikian et al. | 455/70 |
| 4,658,296 | 4/1987 | Beech | 455/70 |
| 4,686,707 | 8/1987 | Iwasaki et al. | 455/70 |
| 4,764,822 | 8/1988 | Taniguchi et al. | 360/48 |
| 4,787,085 | 11/1988 | Suto et al. | 381/2 |
| 4,788,543 | 11/1988 | Rubin | 455/58.1 |
| 4,792,974 | 12/1988 | Chace | 358/343 |
| 4,839,628 | 6/1989 | Davis et al. | |
| 4,841,561 | 6/1989 | Hill | 375/8 |
| 4,910,510 | 3/1990 | Davis et al. | |
| 5,067,119 | 11/1991 | Yoshida et al. | 360/27 |
| 5,077,830 | 12/1991 | Mallia | 455/70 |
| 5,133,081 | 7/1992 | Mayo | 381/2 |
| 5,140,419 | 8/1992 | Galumbeck et al. | 340/825.44 |
| 5,161,251 | 11/1992 | Mankovitz | 381/2 |
| 5,182,553 | 1/1993 | Kung | 455/70 |
| 5,255,190 | 10/1993 | Sznaider | 364/420 |
| 5,257,253 | 10/1993 | Otsubo et al. | 364/48 |
| 5,260,800 | 11/1993 | Sturm et al. | 358/310 |

FOREIGN PATENT DOCUMENTS

| | | |
|---|---|---|
| 0130391 | 1/1985 | European Pat. Off. . |
| 238988 | 9/1987 | European Pat. Off. ................ 381/2 |
| 0402973 | 12/1990 | European Pat. Off. . |
| 3734084 | 4/1990 | Germany . |
| 9113497 | 9/1991 | WIPO . |
| 9116709 | 10/1991 | WIPO . |
| 9115851 | 10/1991 | WIPO . |

OTHER PUBLICATIONS

Patent Abstracts of Japan, Nov. 30, 1988, vol. 12, No. 456, p. 793.

*Primary Examiner*—Forester W. Isen

[57] ABSTRACT

An apparatus and method receive and process information, and adapt the operational characteristics of the processing in response to material included in the received information. More particularly, the apparatus and method embody a software-controlled process which adapts or modifies the software in response to the received information. One embodiment is described in connection with a motion picture film which carries a conventional analog SVA soundtrack and a digital soundtrack with a digital representation of software required to properly process the digital soundtrack. An apparatus and a method according to one embodiment establishes what version of software is required to properly process the digital soundtrack, optionally modifies its software from information carried with the digital soundtrack if the current version on hand is not adequate and uses the updated version of software to process the digital soundtrack on the remainder of the current film and other future films until such time as another software update is required.

16 Claims, 2 Drawing Sheets

DYNAMIC LOADER

CROSS-REFERENCE TO RELATED APPLICATION

This application is a continuation of U.S. application Ser. No. 07/891,590 filed Jun. 1, 1992, resulting in U.S. Pat. No. 5,390,256 on Feb. 14, 1994, which is a continuation-in-part of International Application Number PCT/US 92/00133 filed Jan. 8, 1992, which designates the United States for filing a continuation-in-part of U.S. application Ser. No. 07/804,976 filed Dec. 11, 1991, abandoned, which is a continuation-in-part of U.S. application Ser. No. 07/638,896 filed Jan. 8, 1991, abandoned.

BACKGROUND OF THE INVENTION

As software-controlled devices become increasingly important in many diverse fields of application, the difficulties associated with modifying the software that controls these devices is becoming increasingly troublesome. The need to modify software arises from a variety of situations such as: (1) the software does not operate correctly due to some deficiency in design or implementation, often referred to as a "bug"; (2) the needs of the application in which the software operates have changed, therefore the software must be modified, enhanced, or replaced in order to service the changed needs; or (3) new software is available which provides new features or which services an application more efficiently.

Modifications to software are placed into effect by a procedure referred to herein as an "installation." A particular embodiment of software is referred to herein as a "version" of the software. Thus, modifying or replacing a particular embodiment of software with a different embodiment is referred to as installing a different version of the software.

A later version of software which comprises corrections to bugs or a version which includes additional features is referred to herein as an "upgrade" and the installation of such a version is referred to as "upgrading" the software. Likewise, a former version of software or a version which comprises fewer features is referred to as a "downgrade" and the installation of such a version is referred to as "downgrading" the software.

It should be understood that, as used herein, the term "software" refers to all computer programs regardless of their embodiment. A distinction is sometimes made in the art between "software" which may be loaded directly into computer read/write memory and "firmware" which is embodied in Read Only Memory (ROM). No such distinction is made herein; the term "software" includes both types of computer programs. When necessary, firmware will be distinguished by terms such as "ROM-based software."

With the advent of microprocessor-based personal computers, installing new versions of software is a commonplace experience. This experience illustrates two principal difficulties associated with modifying software: performing the installation itself, and distributing the materials necessary to perform the installation.

Performing software installations is frequently troublesome because it often requires skills not normally possessed by the "end user" of the software product, or it demands time and/or expense which the end user does not wish to expend. The end user is sometimes required to provide critical information such as what type of equipment the installed software is to support, and to elect various options which customize the software's operation according to the end user's preferences.

By improving the sophistication of installation procedures, software developers have reduced the amount of end-user intervention required but some intervention is still generally required to decide at least whether the installation is to take place. End-user intervention is undesirable because it is inconvenient to the end user and because it also introduces an opportunity for mistakes which may invalidate the installation.

Distributing installation materials is difficult because of a host of administrative and logistical problems. The provider of the installation materials must know, for example, who needs the materials, what materials are needed, where and when the materials are needed, and the skill and training levels of the person expected to perform the installation. The responsibility to insure the provider has this knowledge can be placed upon the end user by requiring the end user to request the desired materials, upon the provider of the materials, or it can be shared.

It may be reasonable, for example, to expect an end user to request installation materials for a later version of word processing software which he or she wishes to install only because it has desirable new features.

It is not as reasonable, however, to expect an end user to assume responsibility for requesting installation materials to upgrade ROM-based software in a microprocessor-controlled Compact Disk (CD) player. The average end user probably will not even realize that the CD player is controlled by software. Responsibility must, therefore, fall upon the provider of the installation materials, but unless the provider has accurate records showing who uses which products, distribution of installation materials is difficult at best. Of course, even if the materials can be distributed, the installation itself may be essentially impossible for the end user to perform.

These two difficulties are readily apparent during development of a product such as the CD player mentioned above. During early product development, software is particularly volatile and requires frequent modification. Installation of a new software version entails either replacing the current ROM integrated circuits or "chips" with new ROM chips embodying the new version, or altering the contents of the current ROM chips if the chips are "programmable."

During later development phases, products are commonly subjected to "Beta testing" at locations geographically removed from product developers. The need to modify software continues, but such modifications become more difficult; replacing or reprogramming ROM chips is not normally within the capabilities of the average end user. The end user is normally dependent upon the product developer to install different versions of ROM-based software. The end user is usually required to take the product out of service and deliver it to the manufacturer or an authorized agent who installs new software. This procedure is costly and inconvenient, and perhaps even impossible if the end user cannot afford to take the product out of service.

Because of the difficulties involved with the distribution of installation materials and with the performing of the installation itself, the manufacturer of a CD player, for example, cannot reasonably require an end user to use conventional methods to install different software versions to play particular Compact Disks or particular selections on a Compact Disk. But the ability to install a different software version for each disk or selection offers some attractive advantages.

First, the operating characteristics of the CD player can be altered to accommodate, for example, changes in Compact Disk recording formats. Assuming that format changes are compatible with physical components or "hardware," a CD player can be manufactured now which will be able to playback disks encoded according to some future format not yet defined provided a suitable version of software not yet developed is installed in the CD player.

Similarly, a future playback system can be adapted to playback a disk with an older format provided a suitable version of software is installed. This illustrates an important concept: installations may downgrade as well as upgrade software.

Second, performance of a CD player can be optimized for each disk or selection. The producer of a Compact Disk can incorporate features or special effects not normally needed but which can enhance the playback of the particular disk or selection.

These advantages apply to a wide range of software-controlled "presentation system" products such as cinema soundtrack playback systems, audio-tape and audio-cassette-tape recorders, video-tape and video-cassette-tape recorders, and radio and television receivers. In general, a "presentation system" product receives one or more input signals comprising "presentation material" and processes that material to generate output signals which, in combination with suitable transducers, produce one or more perceptual stimuli such as sounds, visual images, odors, flavors, or touch.

The realization of the advantages discussed above depends upon the ability to provide for automatic installation of software without end user intervention and for automatic distribution of materials required for such an installation.

SUMMARY OF THE INVENTION

It is an object of the present invention to provide an apparatus and a method for the automatic installation of software versions without requiring end user intervention.

It is another object of the present invention to provide an apparatus and a method for the automatic distribution of installation materials to a software installation process.

According to the teachings of the present invention, an apparatus receives information comprising presentation material and operation material. In response to the presentation material, the apparatus generates one or more signals which represent one or more perceptual stimuli such as aural or visual stimuli. In response to the operation material, the system adapts the operational characteristics of the process which generates these signals.

In one embodiment of the present invention for a cinema soundtrack playback system, an apparatus receives from motion picture film stock both soundtrack information and processing software information; the processing software information conveys the version of software required to properly process the soundtrack information. According to this embodiment, the apparatus determines whether the version of software currently embodied in programmable ROM is suitable for processing the film soundtrack, and if not, constructs an appropriate version of software from the processing software information on the film and installs the constructed version in the programmable ROM. After the appropriate version of software is installed, the apparatus operates according to the newly installed software to receive and playback the soundtrack information.

According to further teachings of the present invention, a medium carries encoded information comprising two or more forms of presentation material corresponding to a set of signals representing perceptual stimuli such as aural or visual stimuli and comprising operation material corresponding to operational characteristics of an apparatus for generating perceptual stimuli in response to the presentation material.

In one embodiment of the present invention for a cinema soundtrack recording system, motion picture film stock carries soundtrack information in two forms, a conventional analog SVA soundtrack and a digitally encoded form of the soundtrack, and processing software information; the processing software information conveys the version of software required by a playback system to properly process the digitally encoded soundtrack.

Embodiments as well as objects and advantages of the present invention in addition to those discussed above are set forth throughout this description and particularly below in the Detailed Description of the Invention.

DETAILED DESCRIPTION OF THE INVENTION

Figure 1:
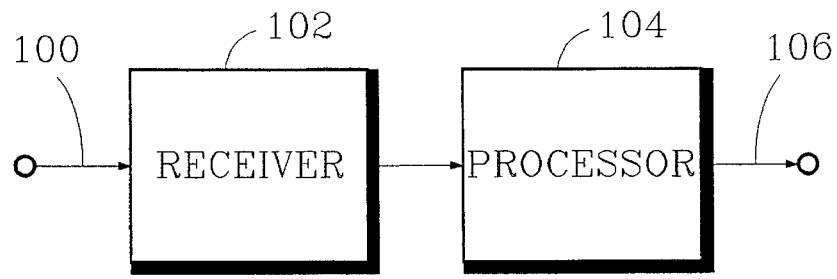
FIG. 1 is a functional block diagram of a presentation system which does not incorporate the present invention.

FIG. 1 illustrates the basic functional structure of a conventional presentation system. Receiver 102 receives from path 100 encoded information, extracts presentation material from the encoded information, and passes the extracted presentation material to processor 104. Processor 104 generates in response to the presentation material one or more signals representing one or more perceptual stimuli and passes these signals along path 106.

In one embodiment of a known CD playback system, for example, receiver 102 receives video-like signals from path 100 which represent visual images on a Compact Disk scanned by a laser-illuminator/photodiode-sensor combination; receiver 102 generates in response to the video-like signals Pulse Code Modulation (PCM) encoded digital information corresponding to the optical patterns carried by the Compact Disk; processor 104 converts the PCM encoded digital information into one or more analog signals which may be amplified and presented by suitable transducers such loudspeakers.

Figure 2:
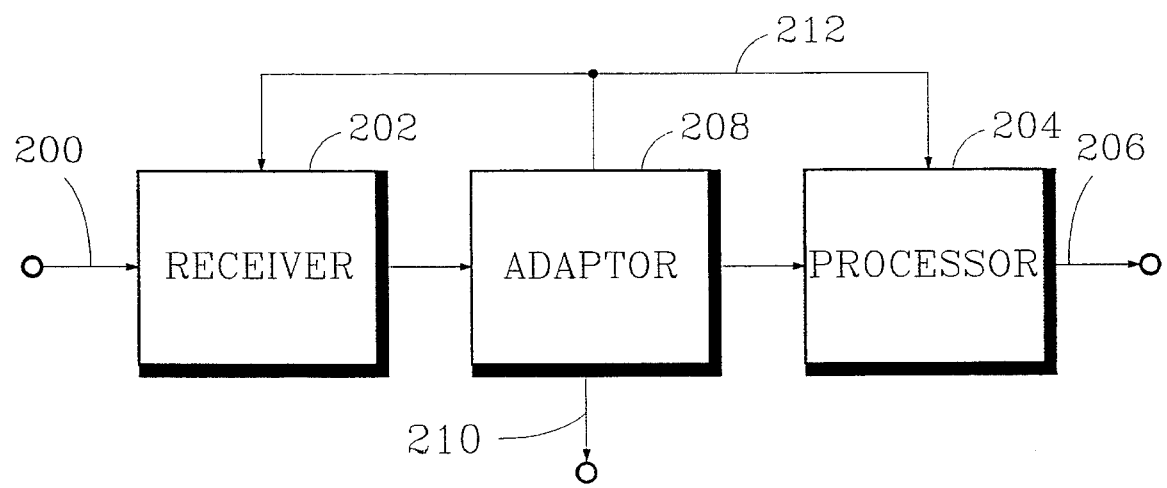
FIG. 2 is a functional block diagram of a presentation system which does incorporate the present invention.

FIG. 2 illustrates a basic functional structure of a presentation system according to the present invention. Receiver 202 receives from path 200 encoded information, extracts presentation material and operation material from the encoded information, and passes the extracted presentation and operation material to adaptor 208. By utilizing path 212 as required, adaptor 208 adapts the operating characteristics of receiver 202, processor 204, and/or adaptor 208 in response to the operation material, and passes the presentation material to processor 204. Processor 204 generates in response to the presentation material one or more signals representing one or more perceptual stimuli and passes these signals along path 206.

In a preferred embodiment of a primary presentation system, adaptor 208 interrupts the flow of presentation material to processor 204 and passes along path 210 instructions to one or more peripheral devices such as a secondary presentation system to provide temporary service while adaptor 208 is adapting the operational characteristics of the primary presentation system.

Many variations in embodiment come within the scope of the present invention: the nature of the information received from path 200, the components which constitute receiver 202 and processor 204, and the nature of the signals passed along path 206 are not critical to the practice of the present invention. For example, receiver 202 for a CD player may comprise both the optics and electronics required to obtain a PCM representation of the optical patterns carried by a disk, in which case the information received from path 200 comprise light waves. An alternative embodiment is like that described above; receiver 202 may comprise only the electronics in which case, for example, the information received from path 200 are video-like signals generated by a laser-illuminator/photodiode-sensor combination.

The allocation of certain processes among receiver 202, adaptor 208, and processor 204 may have important practical significance to the implementation of a presentation system, but the specific allocation chosen is not critical to the practice of the present invention. For example, receiver 202 may apply error detection/correction (EDC) techniques to the digital information recovered from a disk, or adaptor 208 and/or processor 204 may apply such techniques.

In an alternative embodiment, adaptor 208 may follow processor 204; however, the structure illustrated in FIG. 2 is the preferred embodiment for many applications. According to this preferred embodiment, adaptor 208 is placed as early as possible in the processing path so as to minimize the delay in adapting the operational characteristics in response to the operation material.

Figure 3:
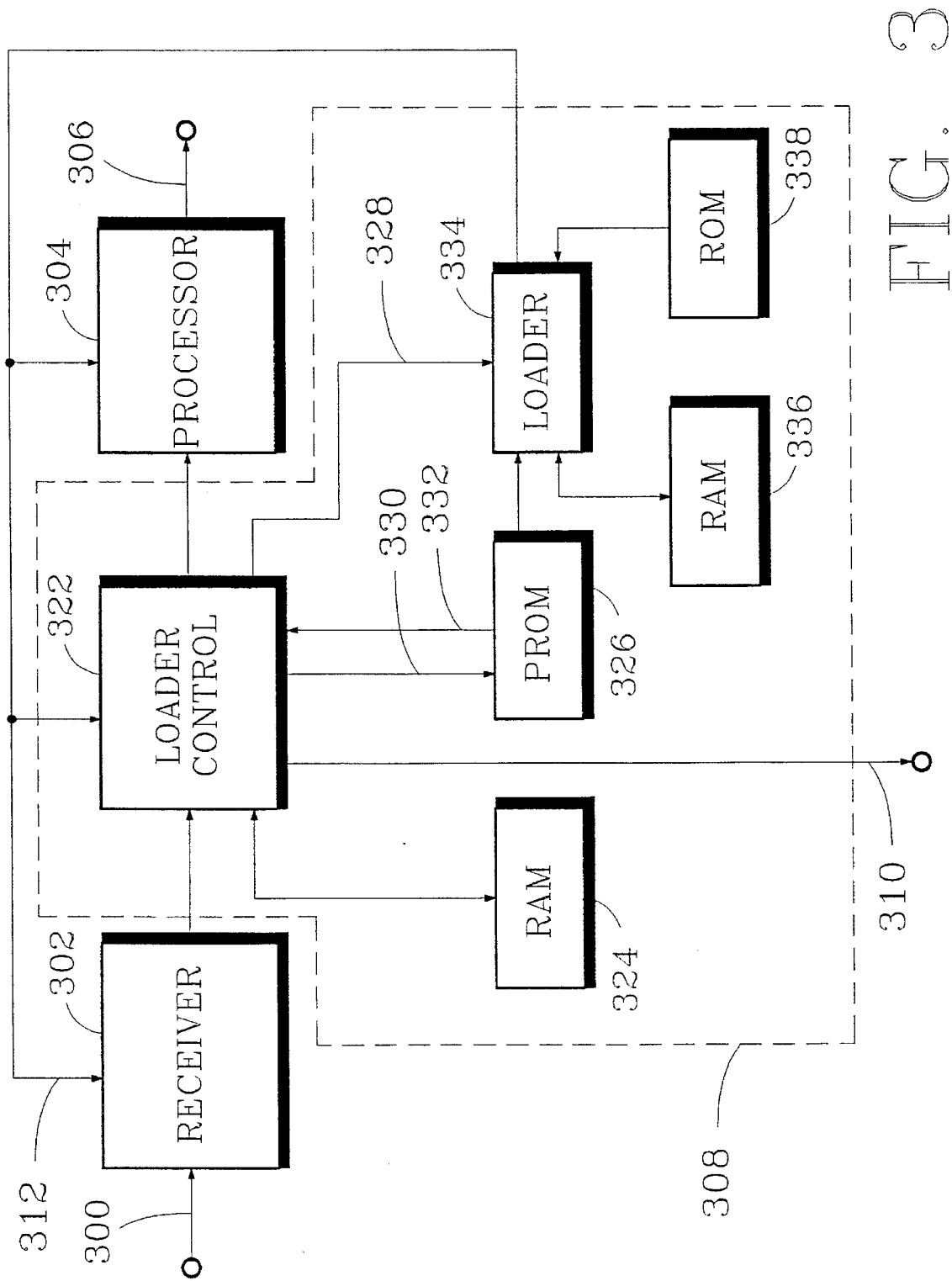
FIG. 3 is a functional block diagram of a cinema soundtrack playback system incorporating a preferred embodiment of the present invention.

FIG. 3 illustrates a basic functional structure of a cinema soundtrack playback system according to the present invention. Receiver 302 receives from path 300 encoded information, extracts presentation material comprising motion picture soundtrack information and operation material comprising processing software information from the encoded information, and passes the extracted soundtrack and processing software information to loader control 322 within adaptor 308. Loader control 322 passes the soundtrack information to processor 304 and optionally calls for the adaption of the operational characteristics of receiver 302, processor 304, and/or loader control 322 in response to the processing software information. Processor 304 generates in response to the soundtrack information one or more signals representing one or more channels of aural stimuli and passes these signals along path 306.

According to one embodiment, the software required to operate the cinema soundtrack playback system comprises several software modules. Each module corresponds to the computer program of one major "function" such as receiver 302, processor 304, or loader control 322.

During initialization of the playback system, loader 334 loads the appropriate software module into each of the major system functions. Loader 334 first examines the contents of Programmable Read Only Memory (PROM) 326. If PROM 326 contains a version of one or more software modules, loader 334 loads those modules into the system functions along path 312. Otherwise, loader 334 loads software modules found in ROM 338.

ROM 338 stores a base version of all software modules required to operate the playback system including the software required to control the operation of loader 334. The base version must be available to downgrade software modules in order to playback soundtracks on films which do not include operation material such as processing software information, and the base version also provides the software necessary to recover from catastrophic failures in PROM 326.

Also during initialization, loader 334 constructs in RAM 336 a "local directory" with entries for each software module indicating the version currently loaded into the system. A list of all software modules and their base version is copied from ROM 338 into RAM 336. Versions of software modules residing in PROM 326 are merged into the directory in RAM 336. Loader 334 also stores into RAM 336 the amount of unused or "free" space available in PROM 326. The local directory and the amount of free space is passed along path 312 to loader control 322.

After initialization is completed, the playback system begins normal operation according to the software loaded into the various functions. Receiver 302 extracts and formats "packets" of information in response to the encoded information received from path 300. An "audio packet" contains soundtrack information. A "software packet" contains processing software information. A "directory packet" contains a directory or an inventory of all software modules carried by the motion picture film, thereby indicating what versions of each software module is required to properly playback the film soundtrack.

Loader control 322 examines the contents of the directory packet and compares it to the local directory to establish whether each software module currently loaded in the system is adequate to properly playback the film soundtrack. If all modules are adequate, audio packets are passed to processor 304 for subsequent processing.

If the directory packet indicates that any of the currently loaded software modules are not adequate, then loader control 322 causes the inadequate modules to be altered by extracting information from certain software packets to construct in RAM 324 the appropriate version of those software modules corresponding to the inadequate modules.

In the preferred embodiment, loader control 322 begins extracting information from "relevant" software packets even before the directory packet is examined. "Relevant" modules are those which are appropriate for the particular hardware implementing the playback system; it should be appreciated that the software packets may convey processing software information appropriate for different playback system implementations. In this manner, loader control 322 can reduce the amount of time required to adapt the operational characteristics of the system by having relevant software modules already constructed, or in the process of being constructed, when the directory packet is examined just in case the directory packet indicates any software modules must be altered. If the directory packet indicates that no software modules need to be updated, loader control 322 stops extracting information from the relevant software packets.

After all of the required new versions have been constructed in RAM 324, loader control 322 checks the amount of free space available in PROM 326. If sufficient free space is available to hold all of the newly constructed modules, then loader control 322 begins loading them along path 330 into the unused areas of PROM 326 and decrements the amount of free space accordingly.

If there is insufficient free space in PROM 326 to hold the newly constructed modules, then loader control 322 obtains along path 332 a copy of those software modules in PROM 326 which do not have a corresponding new version constructed in RAM 324. Thus, loader control 322 places in RAM 324 the appropriate version of all software modules represented in PROM 326 which are required to playback the film soundtrack. After this is accomplished, loader control 322 erases the contents of PROM 326 and then loads along path 330 all modules in RAM 324 into PROM 326.

After loader control 322 completes loading the appropriate versions of software modules into PROM 326, it requests along path 328 that loader 334 reinitialize the system as described above. In this manner, loader control 322 and loader 334 are able to alter the operational characteristics of the playback system by loading appropriate versions of software into each of the major functions along path 312.

The preferred embodiment of the present invention also provides for installing a temporary version of one or more software modules without altering the contents of PROM 326. A "temporary" software packet contains software information which loader control 322 uses to construct a temporary software module in RAM 324 similarly to that described above for normal software packets; however, loader control 322 does not consult the local directory to establish whether a temporary software module should be loaded. Temporary software modules are always loaded into the system.

The loading of temporary software modules is accomplished as follows. After loader control 322 has constructed all of the temporary modules in RAM 324, it requests along path 328 that loader 334 load a special version of the loader control module residing in ROM 338. Operating under this special software version, loader control 322 sends along path 328 to loader 334 the temporary software modules residing in RAM 324. Loader 334 loads the major functions using these temporary modules rather than the corresponding modules in PROM 326 and ROM 338. After initialization is completed, the system begins operation according to the software loaded into the various functions. This feature is particularly useful for testing and for playing back one-of-kind film soundtracks.

In preferred embodiments, Flash Electrically Programmable Read Only Memory implements PROM 326; however, it should be appreciated that other implementations are possible such as Electrically Erasable Programmable Read Only Memory.

In the preferred embodiment of a cinema soundtrack playback system, the motion picture film carries a conventional analog soundtrack in the Stereo Variable Area (SVA) and digitally encoded information comprising software packets and audio packets with digital soundtrack corresponding to the SVA soundtrack. The primary playback system processes the digital soundtrack. If loader control 322 establishes that one or more software modules must be replaced by modules represented by information carried in the software packets, loader control 322 interrupts the flow of audio packets to processor 304 and indicates along path 310 that the primary playback system is interrupting operation. Playback of the film soundtrack may continue uninterrupted by switching to a conventional secondary playback system, not shown, which processes the SVA soundtrack. After new versions of software modules have been loaded and the primary system has resumed operation, loader control 322 indicates along path 310 that playback may switch to the primary system.

Additional details outside the scope of the present invention which pertain to the implementation of the preferred embodiment of a cinema soundtrack playback system are set forth in International Patent Application Number PCT/US 92/00898 filed Feb. 4, 1992, designating the United States, and in International Patent Application Number PCT/US 92/00133 filed Jan. 8, 1992, designating the United States, both of which are hereby incorporated by reference in their entirety. A preferred configuration of blocks containing digital sound track information interleaved with "ancillary blocks" containing ancillary information such as processing software information is set forth particularly on pages 32–33 of application number PCT/US 92/00133; however, the actual configuration of blocks is not critical to the practice of the present invention.

The operation of devices peripheral to the cinema soundtrack playback system may also be adapted in response to operation material. A few examples include altering the acoustic characteristics of a motion picture theater by switching between different loudspeaker systems, altering the equalization characteristics of loudspeaker systems, and moving acoustic panels.

It should be appreciated that the present invention may be used in numerous applications. It is particularly useful in applications utilizing software-controlled products to process information carried by either a storage medium such as optical or magnetic storage media or by a transmission medium such as radio or television broadcasts.

For example, a television receiver may support both current signal standards such as NTSC and an advanced signal standard not yet defined by adapting its operational characteristics in response to operation material carried by the television signal. By defining the advanced signal standard to also include a basic signal standard such as NTSC, such a television receiver may present visual and aural stimuli according to the advanced standard provided it has adequate software, but can switch to the basic signal standard to provide continued operation while installing software required for the advanced signal standard received from the transmission itself.

We claim:

1. An apparatus comprising:

receiver means for receiving encoded information including presentation material and operation material, and for extracting said presentation material and said operation material from said encoded information, wherein said presentation material represents sounds in a first representation and represents the same sounds in a second representation, processor means for generating one or more first output signals reproducing said sounds in response to said presentation material in said first representation, and adaptor means for adapting operational characteristics of said receiver means, said processor means and/or said adaptor means, wherein at least one of said receiver means, said processor means and said adaptor means is controlled by installed software and said adaptor means adapts said operational characteristics by altering or replacing said installed software using update information obtained from said operation material.

2. An apparatus according to claim 1 wherein said operation material comprises at least a portion of each of a plurality of versions of software required by apparatuses to reproduce said sounds, and said adaptor means further comprises control means for selecting an appropriate version from said plurality of versions which is required for proper operation of said apparatus, wherein said adaptor means adapts said operational characteristics by altering or replacing said installed software using update information obtained from said appropriate version of operation material.

3. An apparatus according to claim 1 or 2 wherein said encoded information includes analog soundtrack and digital information carried by motion picture film, said digital information comprising said operation material and said first representation of presentation material, and said analog soundtrack comprising said second representation of presentation material.

4. An apparatus according to claim 1 or 2 further comprising output means for generating one or more second output signals reproducing said sounds in response to said presentation material in said second representation, wherein said processor means interrupts said generating one or more first output signals and said output means generates said one or more second output signals while said adaptor means is altering or replacing said installed software, wherein said apparatus generates one or more output signals reproducing said sounds substantially without interruption.

5. An apparatus according to claim 1 further comprising random access memory (RAM) and programmable memory, wherein said adaptor means stores said update information in said RAM, checks if sufficient space is available in an unused part of said programmable memory to store said update information, loads said update information into said unused part if sufficient space is available, and if sufficient space is not available, stores in said RAM a copy of installed software in said programmable memory not represented by update information stored in said RAM, erases said programmable memory and loads information stored in said RAM into said programmable memory.

6. An apparatus comprising:

receiver means for receiving encoded information including presentation material and operation material, and for extracting said presentation material and said operation material from said encoded information, wherein said presentation material represents sounds and said operation material comprises at least a portion of each of a plurality of versions of software, a respective version of software required by apparatuses to reproduce said sounds, processor means for generating one or more first output signals reproducing said sounds in response to said presentation material, and adaptor means for adapting operational characteristics of said receiver means, said processor means and/or said adaptor means, wherein at least one of said receiver means, said processor means and said adaptor means is controlled by installed software and said adaptor means adapts said operational characteristics by selecting an appropriate version from said plurality of versions and altering or replacing said installed software using update information obtained from said appropriate version of operation material.

7. An apparatus according to claim 2 or 6 wherein said adaptor means alters or replaces only portions of said installed software which do not conform to said appropriate version.

8. An apparatus according to claim 6 further comprising random access memory (RAM) and programmable memory, wherein said adaptor means stores said update information in said RAM, checks if sufficient space is available in an unused part of said programmable memory to store said update information, loads said update information into said unused part if sufficient space is available, and if sufficient space is not available, stores in said RAM a copy of installed software in said programmable memory not represented by update information stored in said RAM, erases said programmable memory and loads information stored in said RAM into said programmable memory.

9. An apparatus comprising:

receiver means for receiving encoded information including presentation material and operation material, and for extracting said presentation material and said operation material from said encoded information, wherein said presentation material represents sounds in a first representation and a second representation, processor means for generating one or more first output signals reproducing said sounds in response to said presentation material in said first representation, adaptor means for adapting operational characteristics of said receiver means, said processor means and/or said adaptor means, wherein at least one of said receiver means, said processor means and said adaptor means is controlled by installed software and said adaptor means adapts said operational characteristics by altering or replacing said installed software using update information obtained from said operation material, and output means for generating one or more second output signals reproducing said sounds in response to said presentation material in said second representation, wherein said processor means interrupts said generating one or more first output signals and said output means generates said one or more second output signals while said adaptor means is altering or replacing said installed software, wherein said apparatus generates one or more output signals reproducing said sounds substantially without interruption.

10. An apparatus according to claim 9 wherein said operation material is represented in a plurality of versions and said apparatus further comprises means for selecting an appropriate version of operation material from said plurality of versions, wherein said adaptor means alters or replaces said software in response to at least a portion of said appropriate version of operation material.

11. An apparatus according to claim 1 or 6 further comprising a local directory representing versions of installed software modules in said apparatus, wherein said receiver means extracts temporary packets, software packets and directory packets from said operation material, said directory packets conveying information regarding which version or versions of installed software modules are adequate, and said adaptor means loads update information obtained from said temporary packets into random access memory, compares information from said directory packets with said local directory and, if any of said versions of installed software modules are not adequate, obtains update information from one or more software packets and alters or replaces software stored in programmable memory.

12. An information storage medium carrying information including presentation material and operation material, wherein said presentation material comprises a plurality of representations of a soundtrack for a motion picture and said operation material comprises at least a portion of software programs required by apparatuses to reproduce said soundtrack in response to one or more of said plurality of representations.

13. An information storage medium according to claim 12 wherein said medium is film, a first representation of said soundtrack is carried in analog form and a second representation of said soundtrack is carried in digital form.

14. An information storage medium according to claim 13 wherein blocks of said second representation are interleaved with blocks of said software programs.

15. An information storage medium according to claim 12 wherein said operation material comprises a plurality of versions of said software programs.

16. An apparatus according to claim 1, 5, 6 or 8 further comprising a local directory representing versions of installed software modules in said apparatus, wherein said receiver means extracts software packets and directory packets from said operation material, said directory packets conveying information regarding which version or versions of software modules are adequate, and said adaptor means compares information from said directory packets with said local directory to determine which of said versions of installed software modules are not adequate, and alters or replaces only those installed software modules determined to be not adequate using update information obtained from one or more software packets.

* * * * *